United States Patent
Jones et al.

(10) Patent No.: US 10,880,516 B2
(45) Date of Patent: Dec. 29, 2020

(54) MULTI-TAP HAVING SELECTABLE CONDITIONING MODULES

(71) Applicant: PPC BROADBAND, INC., East Syracuse, NY (US)

(72) Inventors: Douglas Jones, Cicero, NY (US); David A. Barany, Syracuse, NY (US); André Martineau, Manlius, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 2 days.

(21) Appl. No.: 16/240,343

(22) Filed: Jan. 4, 2019

(65) Prior Publication Data

US 2019/0215481 A1 Jul. 11, 2019

Related U.S. Application Data

(60) Provisional application No. 62/614,561, filed on Jan. 8, 2018.

(51) Int. Cl.
*H04N 7/10* (2006.01)
*H01R 24/54* (2011.01)

(52) U.S. Cl.
CPC ........... *H04N 7/104* (2013.01); *H01R 24/542* (2013.01); *H01R 24/547* (2013.01)

(58) Field of Classification Search
CPC .... H01R 24/542; H01R 24/547; H04N 7/104; H04N 7/106; H01P 5/18; H05K 5/0008; H05K 5/0047; H05K 5/0247; H05K 5/03
See application file for complete search history.

(56) References Cited

U.S. PATENT DOCUMENTS

| 6,570,465 B2 | 5/2003 | Tang |
| 2002/0067222 A1 | 6/2002 | Tang |
| 2009/0113510 A1 | 4/2009 | Knutson et al. |

(Continued)

FOREIGN PATENT DOCUMENTS

| EP | 1596596 A1 * | 11/2005 | ............. H04N 7/104 |
| EP | 1596596 A1 | 11/2005 | |
| WO | 2017/178691 A1 | 10/2017 | |

OTHER PUBLICATIONS

David Large et al., Broadband Cable Access Networks: The HFC Plant, 2009, pp. 250-255.

(Continued)

*Primary Examiner* — Omar S Parra
(74) *Attorney, Agent, or Firm* — MH2 Technology Law Group LLP

(57) ABSTRACT

A tap for a cable-television network includes a coupling device configured to receive downstream signals from a distribution line, to provide upstream signals to the distribution line, or both, a plurality of signal conditioning circuits each configured to apply a signal conditioning effect to the downstream signals, the upstream signals, or both, a path-selection device electrically connected to the coupling device and configured to selectably route signals to one or more of the plurality of signal conditioning circuits, and one or more subscriber ports configured to receive at least some of the signals that are selectably routed by the path-selection device, and configured to connect to one or more cables extending to a subscriber premises.

35 Claims, 2 Drawing Sheets

(56) References Cited

U.S. PATENT DOCUMENTS

| | | | |
|---|---|---|---|
| 2009/0133095 A1* | 5/2009 | Phillips | H03H 7/482 |
| | | | 725/149 |
| 2010/0251322 A1 | 9/2010 | Palinkas et al. | |
| 2011/0099604 A1 | 4/2011 | Riggsby et al. | |
| 2013/0291029 A1* | 10/2013 | Wells | H04N 21/6168 |
| | | | 725/78 |
| 2018/0351268 A1* | 12/2018 | Krapp | H04N 7/104 |

OTHER PUBLICATIONS

Lee W. Young (Authorized Officer), International Search Report and Written Opinion dated Apr. 2, 2019, PCT Application No. PCT/US2019/012371, pp. 1-14.

\* cited by examiner

MULTI-TAP HAVING SELECTABLE CONDITIONING MODULES

FIELD

The present disclosure is directed to cable-television network communication devices. More particularly, the present disclosure relates to a multi-tap for tapping a signal from a distribution line for delivery to a subscriber premises.

BACKGROUND

In cable-television networks, signals can be transmitted bi-directionally between a head-end and potentially many remote, subscriber premises. The networks employ a variety of devices to deliver and condition such signals to enhance quality and performance of the signal transmission.

One type of device that is employed in the networks is a tap. A tap is connected to a distribution line, which continues past the tap or may be terminated at the tap. The tap also provides one or more subscriber ports. A drop cable leading to a subscriber premises may be connected to each of the subscriber ports. The tap provides a splitter, such as a directional coupler, that provides a desired level of attenuation for the signals tapped off to the subscribers (a "tap value").

Taps can also provide signal conditioning. For example, in "return" signals proceeding from the subscriber premises toward the headend, ingress noise can be received from various sources. If left unconditioned, this noise from disparate sources can combine and affect the operation of the network, e.g., the return signal devices thereof. Additionally, signal equalization, cable simulation, and other signal conditioning characteristics may also be desirable at the taps for the "forward" signals, those signals proceeding from the headend to the subscriber. The level of attenuation and/or other conditioning characteristics best suited to the signal can change depending on the location of the tap in the network.

To provide this signal conditioning, plug-in modules have been used. These modules, however, generally require installation in the field and are susceptible to mistakes in the selection of the correct module. Further, configuration of the tap to be used at a particular location requires disassembly and reassembly of the tap to get access to the signal conditioning modules. This process is prone to error. For example, incorrect modules can be inserted. Further, misassembled taps can be susceptible to moisture or other elements that may lead to early failure of the device.

SUMMARY

A multi-tap for a cable-television network is disclosed. The multi-tap includes an input configured to be connected to an upstream portion of a distribution line, an output configured to be connected to a downstream portion of the distribution line or terminated, a through-line configured to electrically connect the input and the output, a first splitter electrically connected to the through-line between the input and the output, a first signal conditioning circuit having a first signal conditioning effect, a second signal conditioning circuit having a second signal conditioning effect, a path-selection device electrically connected to the first splitter and configured to selectably route downstream signals to bypass the first and second conditioning circuits or to proceed to the first signal conditioning circuit, the second signal conditioning circuit, or both, and one or more subscriber ports configured to receive the downstream signals that are selectably routed by the path-selection device, configured to connect to one or more cables extending to a subscriber premises, and configured to receive upstream signals from the one or more cables. The path-selection device is further configured to selectably route the upstream signals from the one or more subscriber ports to bypass the first and second signal conditioning circuits or to proceed to the first signal conditioning circuit, the second signal conditioning circuit, or both.

A tap for a cable-television network is disclosed. The tap includes a coupling device configured to receive downstream signals from a distribution line, to provide upstream signals to the distribution line, or both, a plurality of signal conditioning circuits each configured to apply a signal conditioning effect to the downstream signals, the upstream signals, or both, a path-selection device electrically connected to the coupling device and configured to selectably route signals to one or more of the plurality of signal conditioning circuits, and one or more subscriber ports configured to receive at least some of the signals that are selectably routed by the path-selection device, and configured to connect to one or more cables extending to a subscriber premises.

A method for tapping signals in a cable-television network is also disclosed. The method includes determining a signal conditioning effect for a tap, selecting zero, one, or more of a plurality of signal conditioning modules in a tap circuit based on the signal conditioning effect that was determined, and activating the selected zero, one, or more of the plurality of signal conditioning modules by changing a state or position of a path-selection device of the tap circuit.

Other and different statements and aspects of the invention appear in the following claims. A more complete appreciation of the present invention, as well as the manner in which the present invention achieves the above and other improvements, can be obtained by reference to the following detailed description of a presently preferred embodiment taken in connection with the accompanying drawings, which are briefly summarized below, and by reference to the appended claims.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

DETAILED DESCRIPTION

Embodiments of the disclosure may provide a multi-tap that includes a circuit board with a plurality of signal-conditioning circuits thereon. The signal-conditioning circuits may be activated via a switch or jumper on the circuit board, which directs signals from a splitter to a selected one of the signal conditioning circuits. The signals are then directed to one or more subscriber ports, e.g., via one or more second splitters. The signal conditioning circuits may be implemented as one or more assemblies built or attached onto the circuit board. These circuits can allow, for example, for a single tap to provide several different signal conditioning options. The signal conditioning options selectable in these taps are based upon the tap's value as the value of the tap can have a relationship to the signal characteristics on the distribution line. In turn, this can obviate the use, misapplication and inventorying of plug-in modules that are commonly used today to provide different signal conditioning characteristics.

Figure 1:
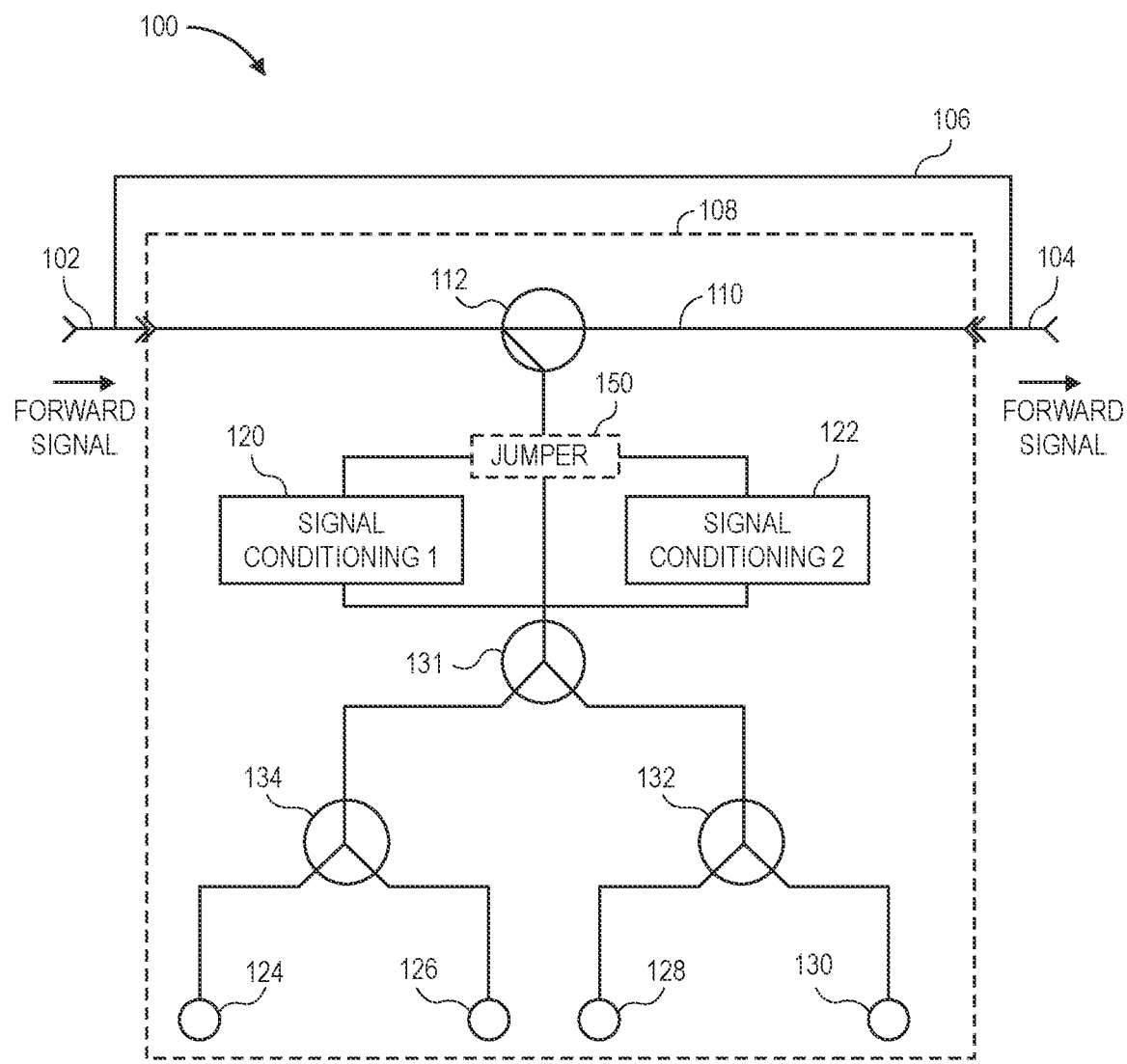
FIG. 1 illustrates a circuit diagram of a multi-tap device for a cable-television network, according to an embodiment.

FIG. 1 illustrates a circuit diagram of a multi-tap 100 (or more simply, a "tap") for a cable-television network, according to an embodiment. The multi-tap 100 may be installed outside of a subscriber premises. The multi-tap 100 includes an input 102 and an output 104, which are connectable to upstream and downstream sections, respectively, of a distribution line. The multi-tap 100 also includes a bypass line 106 and a tap circuit 108. The bypass line 106 may extend parallel to the tap circuit 108 between the input 102 and the output 104 and may be active when the tap circuit 108 is removed, e.g., to provide for continued service in the distribution line when the tap circuit 108 is removed. Accordingly, the bypass line 106 may not communicate with the components of the tap circuit 108.

The tap circuit 108 may be provided on one or more printed circuit boards that may be mounted, e.g., to a faceplate of a housing for the tap 100. The tap circuit 108 may generally include a distribution through-line 110, a coupling device 112, a plurality of signal conditioning circuits or "assemblies" (two shown: 120, 122), and one or more subscriber ports (four shown: 124, 126, 128, 130). Depending on the number of subscriber ports 124, 126, 128, 130 one or more signal splitters may also be included in the tap circuit 108, for example, three splitters 131, 132, 134, as shown.

The through-line 110 may connect the input 102 and may connect to the output 104 and transmit signals therebetween. The coupling device 112 may be coupled to the through-line 110, and may tap signals therefrom at a predetermined level of attenuation. In an embodiment, the coupling device 112 may be a splitter set to divide a signal in any suitable way, e.g., as a directional coupler.

The signal conditioning circuits 120, 122 may be configured to condition upstream and/or downstream signals, e.g., to mitigate noise and/or reflections. The signal conditioning circuits 120, 122 may include the same or similar active (powered) or inactive components configured to condition the signals introduced thereto. For example, the signal conditioning circuits 120, 122 may include one or more of a forward or return path equalizer, a cable simulator, a return path attenuator, a high pass filter, a low pass filter, a high tap value filter, or any other signal conditioning device. The two signal conditioning circuits 120, 122 may include different components, or may include the same components, but with different characteristic values (e.g., different levels of attenuation, different filter frequency cutoffs, etc.). As such, the individual signal conditioning circuits 120, 122 may apply different signal conditioning effects to a signal passing therethrough. Moreover, the signal conditioning circuits 120, 122 may be permanently connected (hardwired) components of the tap circuit 108.

The tap circuit 108 may also include a path-selection device 150. The path-selection device 150 may take the form of a jumper that is removably connected to the circuit board of the tap circuit 108 or another circuit board (e.g., a secondary circuit board). In another embodiment, the path-selection device 150 may be a mechanical or solid-state switch. Any device that is capable of switching between or enabling different aspects of signal conditioning circuits 120, 122 may be employed. The subscriber ports 124, 126, 128 may be electrically connected to the signal conditioning circuits 120, 122, e.g., via the splitters 130, 132, 134.

In use, the path-selection device 150 may be select a signal communication path through zero, one, or both (or more, if present) of the signal conditioning circuits 120, 122. For example, the path-selection device 150 may be set to activate neither, one, or both of the signal conditioning circuits 120, 122, e.g., prior to deployment. In embodiments in which three or more signal conditioning circuits 120, 122 are supplied, the path-selection device 150 may be configured to activate any combination of none, one, or more of such signal conditioning circuits. For example, in an embodiment using a jumper as the path-selection device 150, the jumper may be positioned such that it electrically connects the subscriber ports 124, 126, 128 to the coupling device 112 via the activated signal conditioning circuits 120, 122. The activated signal conditioning circuits 120, 122 may be different depending on the direction of the signal, e.g., upstream signals may proceed through a different signal conditioning circuit 120, 122 (or through neither or both) than the downstream signals. In some cases, signal conditioning may not be called for by the conditions where the tap 100 is to be placed, and thus the path-selection device 150 may be removed or otherwise configured to bypass the signal conditioning circuits 120, 122.

In a specific, example embodiment, the signal conditioning provided by the signal conditioning circuit 120 may be a baseline or "default" signal conditioning effect, with the signal conditioning circuit 122, as a default, being inactive. If circumstances in the field call for additional (or less, or different) signal conditioning, the path-selection device 150 may repositioned or otherwise modulated to route signals to the signal conditioning circuit 122 in addition to (e.g., before or after) the signal conditioning circuit 120. In other embodiments, the path-selection device 150 may be configured to route signals directly to the second conditioning circuit 122 in some situations, and thereby bypass the first conditioning circuit 120 and render the signal conditioning circuit 120 inactive. In other situations, the default signal conditioning effect may be to bypass both the first and second signal conditioning circuits 120, 122, thereby rendering both inactive. Thus, the path-selection device 112 may be positioned or otherwise modulated to activate one or both (e.g., in parallel or in series) first and/or second conditioning circuits 120, 122, depending on a desired signal conditioning effect.

The housing (not shown) of the multi-tap 100 may then be affixed, covering the tap circuit 108 at least. The subscriber ports 124, 126, 128, 130 may extend from the tap for connection to drop cables. The path-selection device 150 may be contained within the housing, such that it is not accessible from the exterior, but in other embodiments, may be accessible either on the outside or through the housing. The inclusion of two or more signal conditioning circuits 120, 122 may provide for an associated number of conditioning options for a single tap 100, thereby potentially reducing inventory requirements for a network owner/operator.

Figure 2:
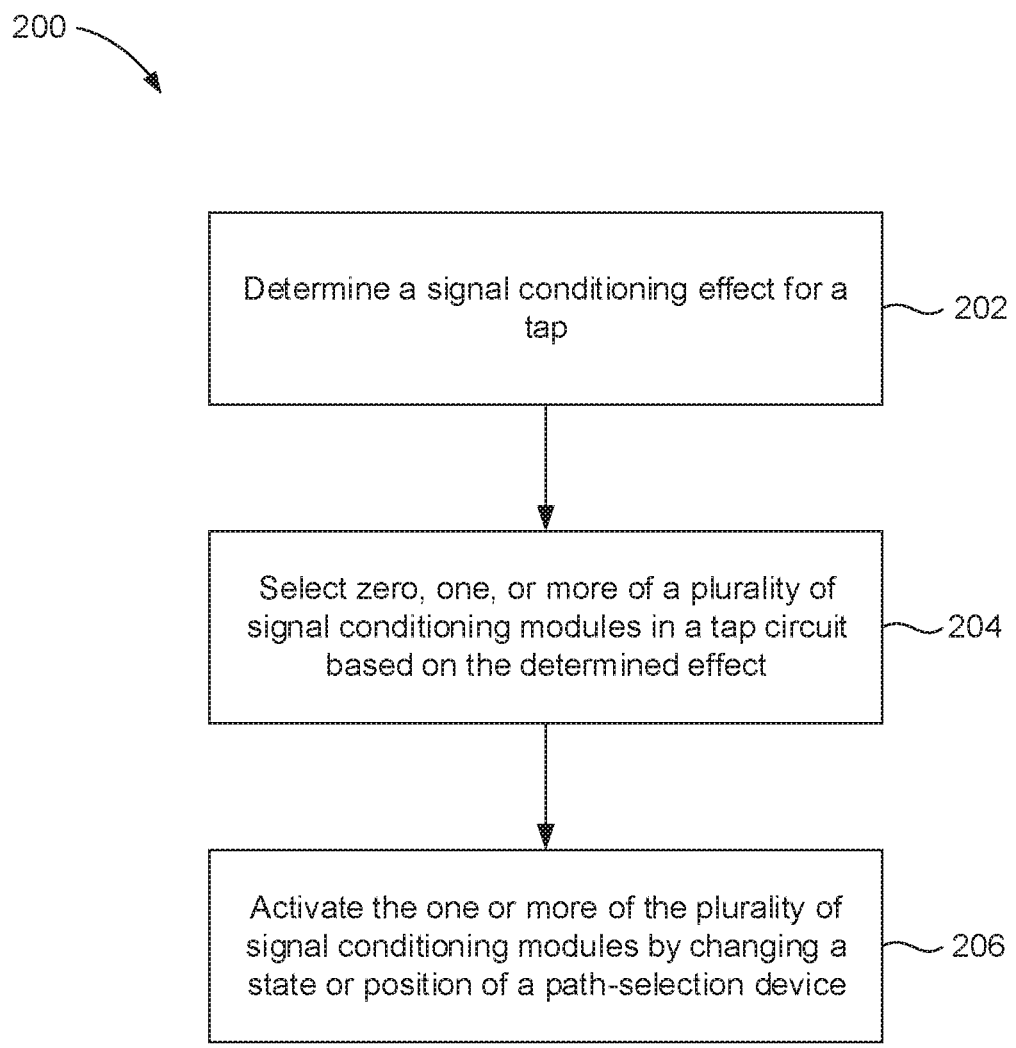
FIG. 2 illustrates a flowchart of a method for tapping a signal in a cable-television network, according to an embodiment.

FIG. 2 illustrates a flowchart of a method 200 for tapping a signal in a cable-television network, according to an embodiment. The method 200 includes determining a signal conditioning effect for a tap, as at 202. This effect may be determined based on market information, field measurements, etc. Further, the signal conditioning effect may be determined for upstream signals, downstream signals, or both, whether the same or different. The method 200 also includes selecting one or more of a plurality of signal conditioning modules in a tap circuit based on the signal conditioning effect that was determined, as at 204.

The method 200 further includes activating the selected zero, one, or more of the plurality of signal conditioning circuits, as at 206. In an embodiment, activating at 206 includes changing a state or position of a path-selection device that switches between or enables different aspects of a plurality of signal conditioning modules. For example, the path-selection device may be or include one or more switches or jumpers, which may be modulated, modified, or otherwise positioned to activate or select one or more of the signal conditioning modules. In some situations, the selection at 206 may be to active none of the signal conditioning circuits, and thus the path-selection device may be employed to bypass (or allow bypass) of the signal conditioning circuits. In other situations, the selection at 206 may be to active different signal conditioning circuits for upstream and downstream signals, which may be implemented by the path-selection device (e.g., using two jumpers). In still other situations, two or more of the plurality of signal conditioning circuits may be activated in series, such that signals proceed through both and receive the signal conditioning effects of both signal conditioning circuits.

In an embodiment, the method 200 may also include connecting an input of the tap to a distribution line. The tap may include a directional coupler that is coupled to path selection device, so as to provide a signal from the distribution line to the subscriber ports via the activated signal conditioning circuits (or by bypassing the signal conditioning circuits if none are activated).

In an embodiment, the method 200 may also include connecting one or more subscriber ports to one or more drop lines configured to extend to a subscriber premises. The one or more subscriber ports may be connected to the activated one or more of the plurality of signal conditioning circuits, so as to receive a downstream signal from the activated one or more of the plurality of signal conditioning circuits, or to provide an upstream signal to the activated one or more of the plurality of signal conditioning circuits, or both. In the case that the signal conditioning circuits are bypassed, the subscriber ports may receive the downstream signals from, and provide upstream signals to, the coupling device, without the signals going through the signal conditioning circuits.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. The present disclosure is not to be limited in terms of the particular embodiments described in this application, which are intended as illustrations of various aspects. Many modifications and variations can be made without departing from its spirit and scope, as will be apparent to those skilled in the art. Functionally equivalent apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What is claimed is:

1. A multi-tap for a cable-television network, comprising:
   an input configured to be connected to an upstream portion of a distribution line;
   an output configured to be connected to a downstream portion of the distribution line or terminated;
   a through-line configured to electrically connect the input and the output;
   a first splitter electrically connected to the through-line between the input and the output;
   a first signal conditioning circuit having a first signal conditioning effect;
   a second signal conditioning circuit having a second signal conditioning effect, wherein the first and second signal conditioning effects provide different equalization values to the multi-tap;
   a path-selection device electrically connected to the first splitter and configured to selectably route downstream signals to bypass the first and second conditioning circuits or to proceed to the first signal conditioning circuit, the second signal conditioning circuit, or both;
   one or more subscriber ports configured to receive the downstream signals that are selectably routed by the path-selection device, configured to connect to one or more cables extending to a subscriber premises, and configured to receive upstream signals from the one or more cables;
   wherein the path-selection device is further configured to selectably route the upstream signals from the one or more subscriber ports to bypass the first and second signal conditioning circuits or to proceed to the first signal conditioning circuit, the second signal conditioning circuit, or both;
   wherein the multi-tap does not prevent the downstream signals from reaching the one or more subscriber ports; and
   wherein the multi-tap does not prevent the upstream signals from reaching the input.

2. The multi-tap of claim 1, wherein the first signal conditioning effect is different from the second signal conditioning effect.

3. The multi-tap of claim 1, wherein the first splitter comprises one or more directional couplers.

4. The multi-tap of claim 1, further comprising one or more second splitters electrically connected to the first and second signal conditioning circuits and the one or more subscriber ports.

5. The multi-tap of claim 1, further comprising a bypass line that extends between the input and the output and does not communicate with the first splitter.

6. The multi-tap of claim 1, wherein the path-selection device comprises a positionable jumper.

7. The multi-tap of claim 6, wherein the jumper is positionable to route downstream signals from the first splitter:
   to the one or more subscriber ports and not through the first or second signal conditioning circuits;
   to the first signal conditioning circuit and not the second signal conditioning circuit;
   to the second signal conditioning circuit and not the first signal conditioning circuit; and
   to the first signal conditioning circuit, from the first signal conditioning circuit to the second signal conditioning circuit, and from the second signal conditioning circuit to the one or more subscriber ports.

8. The multi-tap of claim 1, wherein the first signal conditioning circuit and the second signal conditioning circuit each comprise one or more components selected from the group consisting of: a forward or return path equalizer, a cable simulator, a return path attenuator, a high pass filter, a low pass filter, a high tap value filter.

9. The multi-tap of claim 1, wherein the multi-tap does not comprise a plug-in module.

10. The multi-tap of claim 1, wherein the path-selection device is configured to route the downstream signals through a first path through the multi-tap, and to route the upstream signals through a second path through the multi-tap, wherein the first and second paths are different.

11. The multi-tap of claim 10, wherein the first path proceeds through the first signal conditioning circuit but not the second signal conditioning circuit.

12. The multi-tap of claim 11, wherein the second path proceeds through the second signal conditioning circuit but not the first signal conditioning circuit.

13. The multi-tap of claim 10, wherein the path-selection device is configured to simultaneously route the downstream signals through the first path and route the upstream signals through the second path.

14. The multi-tap of claim 10, wherein the path-selection device is configured to actuate at least between a first state and a second state, wherein the path-selection device in the first state is configured to cause the first path to extend through the first signal conditioning circuit and subsequently through the second signal conditioning circuit, and wherein the path-selection device in the second state is configured to cause the first path to extend through the second signal conditioning circuit and subsequently through the first signal conditioning circuit.

15. The multi-tap of claim 10, wherein the path-selection device is configured to actuate at least between a first state and a second state, wherein the path-selection device in the first state is configured to cause the second path to extend through the first signal conditioning circuit and subsequently through the second signal conditioning circuit, and wherein the path-selection device in the second state is configured to cause the second path to extend through the second signal conditioning circuit and subsequently through the first signal conditioning circuit.

16. A tap for a cable-television network, comprising:
    a coupling device configured to receive downstream signals from a distribution line, to provide upstream signals to the distribution line, or both;
    a plurality of signal conditioning circuits each configured to apply a different signal conditioning effect to the downstream signals, the upstream signals, or both, wherein the different signal conditioning effects provide different equalization values to the tap;
    a path-selection device electrically connected to the coupling device and configured to selectably route signals to one or more of the plurality of signal conditioning circuits;
    one or more subscriber ports configured to receive at least some of the signals that are selectably outed by the path-selection device, and configured to connect to one or more cables extending to a subscriber premises;
    wherein the tap does not prevent the downstream signals from reaching the one or more subscriber ports; and
    wherein the tap does not prevent the upstream signals from reaching the distribution line.

17. The tap of claim 16, wherein the coupling device comprises a directional coupler.

18. The tap of claim 16, wherein the plurality of signal conditioning circuits comprises a first signal conditioning circuit and a second signal conditioning circuit, wherein the signal conditioning effect of the first signal conditioning circuit is different from the signal conditioning effect of the second signal conditioning circuit.

19. The tap of claim 18, wherein the path-selection device is configured to selectably route downstream signals from the coupling device along one of a plurality of signal communication paths, wherein the individual signal communication paths each extend from the path-selection device and:
   to the first signal conditioning circuit and not the second signal conditioning circuit;
   to the second signal conditioning circuit and not the first signal conditioning circuit;
   to the first signal conditioning circuit, from the first signal conditioning circuit to the second signal conditioning circuit; or
   bypass the first and second signal conditioning circuits.

20. The tap of claim 16, wherein at least one of the plurality of signal conditioning circuits comprises one or more components selected from the group consisting of: a forward or return path equalizer, a cable simulator, a return path attenuator, a high pass filter, a low pass filter, a high tap value filter.

21. The tap of claim 16, further comprising:
   an input coupled to the distribution line;
   an output coupled to the distribution line;
   a bypass line extending between the input and the output;
   wherein the bypass line is configured not to communicate with the plurality of signal conditioning circuits;
   wherein the coupling device is configured to receive downstream signals from the distribution line via the input, and to provide upstream signals to the distribution line via the input; and
   wherein the upstream and downstream signals are each selectably routed through zero, one, or more of the plurality of signal conditioning circuits.

22. The tap of claim 21, further comprising a through-line extending between the input and the output, the coupling device being electrically connected to the through-line.

23. A method for tapping signals in a cable-television network, comprising:
   determining a signal conditioning effect for a tap;
   selecting zero, one, or more of a plurality of signal conditioning modules in a tap circuit based on the signal conditioning effect that was determined, wherein each of the signal conditioning modules provides a different equalization value to the tap; and
   activating the selected zero, one, or more of the plurality of signal conditioning modules in series or in parallel by changing a state or position of a path-selection device of the tap circuit.

24. The method of claim 23, further comprising connecting an input of the tap and an output of the tap to a distribution line, wherein the tap comprises a directional coupler that is electrically connectable to the plurality of signal conditioning modules, so as to provide a signal from the distribution line to the activated zero, one, or more of the plurality of signal conditioning modules.

25. The method of claim 24, wherein the path-selection device is electrically connected to the directional coupler and the plurality of signal conditioning modules.

26. The method of claim 25, wherein the path-selection device comprises a jumper that is positionable to selectively activate the selected zero, one, or more of the plurality of signal conditioning modules.

27. The method of claim 26, wherein activating the selected one or more of the plurality of signal conditioning modules comprises connecting a first splitter that is connected to an input of the tap to the selected one or more of the plurality of signal conditioning modules by adjusting a position of the jumper.

28. The method of claim 23, further comprising connecting one or more subscriber ports to one or more drop lines configured to extend to a subscriber premises, wherein the one or more subscriber ports are connected to the activated one or more of the plurality of signal conditioning modules, so as to receive a signal from the activated one or more of the plurality of signal conditioning modules, or to provide a signal to the activated one or more of the plurality of signal conditioning modules, or both.

29. The method of claim 23, wherein activating the selected zero, one, or more of the plurality of signal conditioning modules comprises activating two of the plurality of signal conditioning modules in series.

30. The method of claim 23, wherein activating the selected zero, one, or more of the plurality of signal conditioning modules comprises activating two of the plurality of signal conditioning modules in parallel.

31. A multi-tap for a cable-television network, comprising:
   an input configured to be connected to an upstream portion of a distribution line;
   an output configured to be connected to a downstream portion of the distribution line;
   a first splitter configured to have a common terminal connected to the input and to have a first leg connected to the output;
   a path-selection device configured to be connected to a second leg of the first splitter, wherein the path-selection device is further configured to actuate between a first state and a second state;
   a first signal conditioning circuit configured to be connected to the path-selection device, wherein the first signal conditioning circuit is configured to provide a first signal conditioning effect to the downstream signals, the upstream signals, or both;
   a second signal conditioning circuit configured to be connected to the path-selection device, wherein the second signal conditioning circuit is configured to provide a second signal conditioning effect to the downstream signals, the upstream signals, or both, wherein the first and second signal conditioning effects provide different equalization values to the multi-tap;
   a second splitter configured to be connected to the first and second signal conditioning circuits;
   a plurality of subscriber ports configured to be connected to the second splitter, wherein each subscriber port is also configured to be connected to a different subscriber premises;
   wherein the multi-tap does not comprise a plug-in module;
   wherein the multi-tap does not prevent the downstream signals from reaching the subscriber ports; and
   wherein the multi-tap does not prevent the upstream signals from reaching the input.

32. The multi-tap of claim 31, wherein the path-selection device is configured to route downstream signals through a first path through the multi-tap and route upstream signals through a second path through the multi-tap, wherein the first and second paths are different, wherein the first state causes the first path to proceed through the first signal conditioning circuit and subsequently through the second signal conditioning circuit, and wherein the second state causes the first path to proceed through the second signal conditioning circuit and subsequently through the first signal conditioning circuit.

33. The multi-tap of claim 32, wherein the path-selection device is configured to simultaneously route downstream signals through the first path through the multi-tap and route upstream signals through the second path through the multi-tap.

34. A multi-tap for a cable-television network, comprising:
   an input configured to be connected to an upstream portion of a distribution line;
   an output configured to be connected to a downstream portion of the distribution line or terminated;
   a through-line configured to electrically connect the input and the output;
   a first splitter electrically connected to the through-line between the input and the output;
   a first signal conditioning circuit having a first signal conditioning effect;
   a second signal conditioning circuit having a second signal conditioning effect, wherein the first and second signal conditioning effects provide different equalization values to the multi-tap;
   a path-selection device electrically connected to the first splitter and configured to selectably route downstream signals through a first path to bypass the first and second conditioning circuits or to proceed to the first signal conditioning circuit, the second signal conditioning circuit, or both;
   one or more subscriber ports configured to receive the downstream signals that are selectably routed by the path-selection device, configured to connect to one or more cables extending to a subscriber premises, and configured to receive upstream signals from the one or more cables;
   wherein the path-selection device is further configured to selectably route the upstream signals from the one or more subscriber ports through a second path to bypass the first and second signal conditioning circuits or to proceed to the first signal conditioning circuit, the second signal conditioning circuit, or both;
   wherein the first and second paths are different;
   wherein the path-selection device is configured to actuate at least between a first state and a second state;
   wherein the path-selection device in the first state is configured to cause the first path to extend through the first signal conditioning circuit and subsequently through the second signal conditioning circuit; and
   wherein the path-selection device in the second state is configured to cause the first path to extend through the second signal conditioning circuit and subsequently through the first signal conditioning circuit.

35. A multi-tap for a cable-television network, comprising:
   an input configured to be connected to an upstream portion of a distribution line;
   an output configured to be connected to a downstream portion of the distribution line or terminated;
   a through-line configured to electrically connect the input and the output;
   a first splitter electrically connected to the through-line between the input and the output;
   a first signal conditioning circuit having a first signal conditioning effect;
   a second signal conditioning circuit having a second signal conditioning effect, wherein the first and second signal conditioning effects provide different equalization values to the multi-tap;
   a path-selection device electrically connected to the first splitter and configured to selectably route downstream signals through a first path to bypass the first and second conditioning circuits or to proceed to the first signal conditioning circuit, the second signal conditioning circuit, or both;
   one or more subscriber ports configured to receive the downstream signals that are selectably routed by the path-selection device, configured to connect to one or more cables extending to a subscriber premises, and configured to receive upstream signals from the one or more cables;
   wherein the path-selection device is further configured to selectably route the upstream signals from the one or more subscriber ports through a second path to bypass the first and second signal conditioning circuits or to proceed to the first signal conditioning circuit, the second signal conditioning circuit, or both;
   wherein the first and second paths are different;
   wherein the path-selection device is configured to actuate at least between a first state and a second state;
   wherein the path-selection device in the first state is configured to cause the second path to extend through the first signal conditioning circuit and subsequently through the second signal conditioning circuit; and
   wherein the path-selection device in the second state is configured to cause the second path to extend through the second signal conditioning circuit and subsequently through the first signal conditioning circuit.

* * * * *